United States Patent [19]

Vonhausen

[11] Patent Number: 4,638,977
[45] Date of Patent: Jan. 27, 1987

[54] VALVE ACTUATOR

[75] Inventor: Georg Vonhausen, Nauheim, Fed. Rep. of Germany

[73] Assignee: General Motors Corporation, Detroit, Mich.

[21] Appl. No.: 792,192

[22] Filed: Oct. 28, 1985

[30] Foreign Application Priority Data

Aug. 11, 1984 [DE] Fed. Rep. of Germany ....... 3429660

[51] Int. Cl.⁴ ............................................. F16K 31/53
[52] U.S. Cl. ...................................... 251/248; 74/25; 74/89.16; 74/437; 251/249
[58] Field of Search ................. 74/437, 25, 89, 89.16; 251/248, 249, 249.5, 250.5

[56] References Cited

U.S. PATENT DOCUMENTS

| 18,912 | 12/1857 | Ketcham | 251/249.5 |
| 28,502 | 5/1860 | Rains | 251/249 |
| 2,159,219 | 5/1939 | Madden | 251/249.5 |
| 2,203,120 | 6/1940 | Young | 251/249.5 |
| 2,399,925 | 5/1946 | Hewlett, Jr. | 74/437 |
| 2,504,006 | 4/1950 | Davis | 251/249.5 |
| 2,585,971 | 2/1952 | Sloane | 74/437 |
| 2,986,373 | 5/1961 | Masheder | 251/248 |
| 3,911,757 | 10/1975 | Rix et al. | 74/437 |

FOREIGN PATENT DOCUMENTS 2012000 4/1975 Fed. Rep. of Germany .
2504475 4/1976 Fed. Rep. of Germany .

Primary Examiner—George L. Walton
Attorney, Agent, or Firm—R. L. Phillips

[57] ABSTRACT

A valve actuation system is disclosed having a spur wheel which meshes with a crown-wheel segment attached to the valve. For linear increase or decrease in the flow cross section, the toothing of the crown-wheel segment is arranged to produce a multiplication ratio which decreases and/or increases in the direction of opening, i.e., which produces valve opening rates which become smaller and/or larger.

2 Claims, 3 Drawing Figures

VALVE ACTUATOR

TECHNICAL FIELD

The invention pertains to an arrangement for actuating a valve, particularly a control valve for mixed-air heating in motor vehicles, with a spur wheel whose shaft extends at approximately a right angle to the rotatable shaft of the valve, to which latter shaft a crown-wheel segment is nonrotatably connected with whose teeth the spur wheel meshes.

BACKGROUND OF THE INVENTION

This type of actuation for a control valve has been disclosed by German Patent Publication No. 2,012,000. With this type of actuation arrangement, as with other actuations, the area of the flow cross-section does not uniformly correspond to the travel of the actuation unit, but rather the cross-section of the opening progressively increases at a uniform opening rate or at a steadily increasing valve opening travel. This is undesirable, especially when the control valve is used to control a cold air flow and a hot air flow for mixed-air heating, and the goal is linear control of the mixed air. According to German Pat. No. 2,504,475, linear control of the mixed air can be obtained by coupling to the free end of the control valve a scoop-shaped part which leads or lags behind the movement of the control valve. However, this type of arrangement is relatively complex.

SUMMARY OF THE INVENTION

The basic purpose of the present invention is to create an arrangement which produces, in a simple manner, a linear increase or decrease in the flow cross-section, i.e., linear control of the mixed air.

This is accomplished using an arrangement of the type initially mentioned but wherein the teeth on a crown-wheel segment are formed to create a declining and/or rising multiplication ratio in the direction of valve opening, i.e., a valve opening rate which becomes less or greater.

The control valve, when it is used to uncover and seal off a single air conduit, can thus operate with a lag during its opening travel, i.e., the opening cross-section linearly increases with uniform opening travel of the actuation unit. When a single control valve is used for simultaneous control of one hot air and one cold air conduit, the valve can be controlled with both a lead and a lag depending on the requirement over its entire travel.

One advantageous practical implementation of the invention occurs when the teeth of the crown wheel segment are radially arranged corresponding to the variable multiplication ratio at various distances from the center of rotation of the crown-wheel segment, and the width of the tooth face of the driving spur wheel corresponds to the contact zone of the crown-wheel segment.

DESCRIPTION OF PREFERRED EMBODIMENT OF THE INVENTION

The preferred implementation of the invention will be explained in more detail with reference to the drawing in which.

Figure 1:
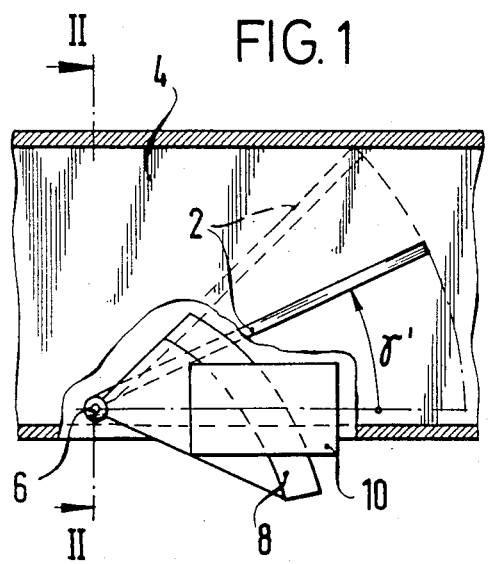
FIG. 1 is a side view with parts in section and parts broken away of an air conduit with a control valve and with its actuation arrangement in a more schematic manner.

The invention is shown in use with a simple control valve 2 which seals off an air conduit 4 or uncovers its flow cross-section. The control valve 2 which is shown in solid lines in an intermediate position, is mounted for rotation on shaft 6. Fixed to the control valve 2 is the crown-wheel segment 8 of the actuation arrangement, which is placed at the side of the air conduit 4. The spur wheel 10 fixed to shaft 11 meshes therewith. The crown-wheel segment 8 and spur wheel 10 form a bevel and spur drive, which have both intersecting and crossing shaft axes. The driven direction of rotation is therefore tilted at 90° to the driving direction of rotation.

Figure 2:
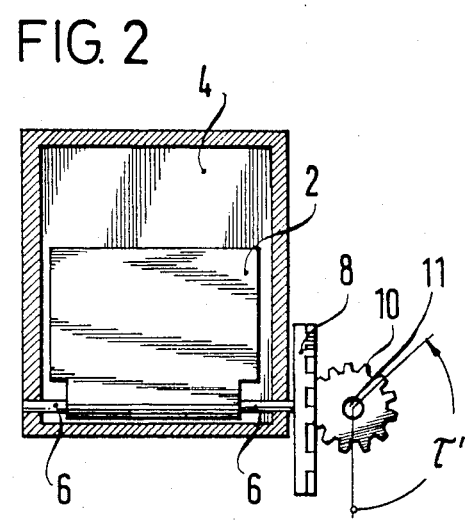
FIG. 2 is a section along line 2—2 in FIG. 1.
Figure 3:
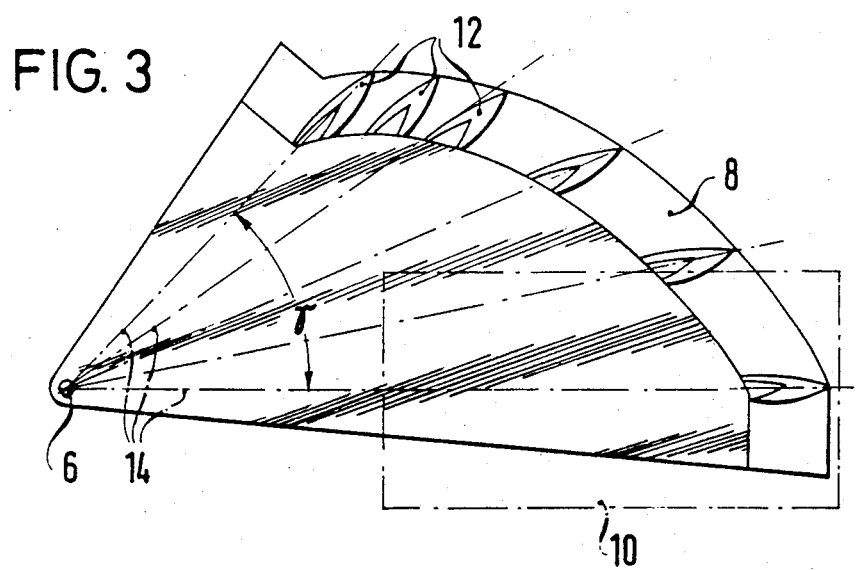
FIG. 3 shows the actuation arrangement in FIG. 1 in enlarged scale.

The teeth 12 of the crown-wheel segment 8, as shown in FIG. 3, are at various distances from the center of rotation 6. In FIG. 3, the distance between the teeth 12 and the center of rotation 6 increases from left to right. The constructed dashed lines 14, the outer ones of which enclose the total driven angle of rotation $\gamma$, i.e., the total driven angle of rotation of the valve 2, and which individually divide such angle into four parts, show this clearly, since the lengths from the center of rotation 6 to the segment bearing the teeth 12 are different. The total angle of rotation $\gamma = 45°$ of the crown-wheel segment 8 corresponds in this implementation to an angle of rotation $\tau = 270°$ of the spur wheel 10. In FIGS. 1 and 2, the angles of the in-between settings are designated $\gamma'$ and $\tau'$. A linear change in multiplication ratio is obtained over the portion of the segment shown. It is, of course, possible to have another progression for the crown-wheel segment if another multiplication progression is desired or required. The multiplication can even be reversed for a single direction of travel if this is advantageous in terms of using the control valve for simultaneous control of a hot air and cold air conduit. The width of the tooth faces on the spur wheel 10, which is an involute cylinder wheel, must of course, be sized accordingly so that it meshes over the entire length of the crown-wheel segment 8.

The pitch of the driven crown-wheel segment 8 corresponds to the instantaneous multiplication ratio. The instantaneous pitch $Z_2$ of the driven crown-wheel segment 8 is determined by the multiplication progression selected:

$$Z_2 = 16 Z_1 / \pi (\gamma + \pi/4).$$

The tooth contour of the teeth 12 on the driven crown-wheel segment 8 varies over the width of the tooth. It is determined by the basic layout of the toothing as paired with the driving involute pinion 10. The tooth contour of the teeth 12 on the crown-wheel segment 8 is limited by the shape of its tooth profile. On the outer end of the tooth, it is limited by the appearance of sharp teeth. At the inner end of the tooth, the limitation arises as a result of natural undercutting resulting from decreasing mesh angle. This variable ratio bevel and spur gearing thus has only limited application to power transmission.

The spur wheel 10 can be manufactured in a known manner using gear-hobbing processes, while the crown-wheel segment 8 is manufactured by the generating method.

The above described preferred embodiment is illustrative of the invention which may be modified within the scope of the appended claims.

The embodiments of the invention in which an exclusive property or privilege is claimed are defined as follows:

1. Arrangement for actuating a control valve for mixed air heating systems in motor vehicles and the like comprising a non-shiftable spur wheel connected to a shaft that extends approximately at right angles to a rotatable shaft that is connected to the valve, a crown-wheel segment connected to said valve shaft having teeth continuously meshing with the spur wheel characterized by the teeth on the crown wheel segment having a pitch that decreases and/or increases in the direction of opening of the valve to thereby decrease and/or increase the rate of opening of the valve always within a full revolution of the spur wheel in either direction thereof and always retaining said continuous meshing.

2. Arrangement according to claim 1, characterized by the teeth of the crown-wheel segment being arranged in a radial direction at different distances from the center of rotation of the crown wheel segment according to a predetermined variable gear ratio, and the width of the teeth of the driving spur wheel being formed to correspond to the meshing zone of the crown-wheel segment.

* * * * *